Patented Nov. 2, 1937

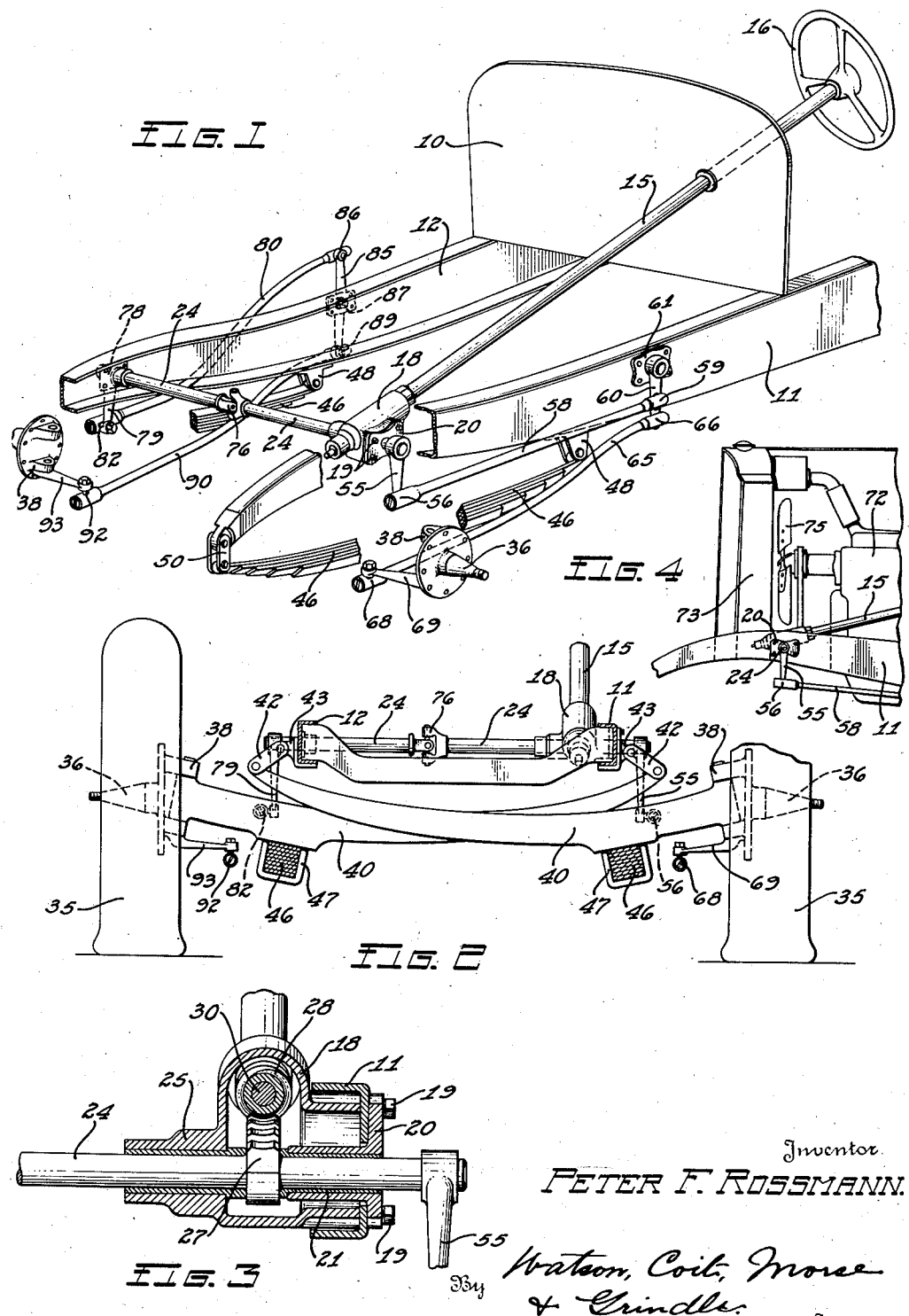

2,097,739

UNITED STATES PATENT OFFICE 2,097,739

MOTOR VEHICLE

Peter F. Rossmann, Detroit, Mich., assignor to Packard Motor Car Company, Detroit, Mich., a corporation of Michigan Application February 13, 1934, Serial No. 711,056

7 Claims. (Cl. 280—95)

This invention relates to motor vehicles and more particularly to mechanism for controlling the steering movements of the vehicle wheels. It is an object of the invention to provide steering apparatus contributing to the convenience and comfort of the operator by reducing the angle which the usual steering shaft makes with a horizontal plane with consequent reduction in the angular disposition of the steering hand wheel with respect to a vertical plane, this result being achieved by locating the steering gear housing at the lower end of the steering shaft at a point well forward of the conventional location.

While the invention is not restricted in use to any particular type of wheel suspension, it is especially adapted to suspensions of the type in which the road wheels are independently sprung from the vehicle frame. Thus it is common practice to employ, in combination with an independent wheel suspension, separate steering drag links for the road wheels at opposite sides of the vehicle, owing to the difficulty of accommodating more conventional types of steering apparatus to the peculiar movements of which independently sprung wheels partake in rising and falling. These steering drag links are frequently connected for conjoint operation by linkage including a shaft extending transversely of the vehicle frame from one side to the other, this shaft being substantially in a transverse vertical plane passing through the steering gear housing. When the steering gear housing occupies the customary position, the motor block and crank case lie adjacent the housing and thus the employment of a transverse shaft at this point is both inconvenient and expensive. In accordance with the present invention, however, in which the steering gear housing is located adjacent the steerable road wheel, such a transverse shaft may be located forwardly of the motor and this inconvenience avoided.

Further objects and features of the invention will be apparent from the following description taken in connection with the accompanying drawing, in which—

Figure 1 is a perspective view of the forward end of a motor vehicle frame and associated steering mechanism, parts being removed or broken away to clarify the illustration;

Figure 2 is a front elevation, with the springs and vehicle frame members in section, of the construction shown in Figure 1;

Figure 3 is a fragmentary sectional view taken on a substantially vertical transverse plane through the steering gear housing; and Figure 4 is a side elevation of the forward end of a motor vehicle to which the invention is applied.

In order to facilitate an understanding of the invention, specific reference is made herein to various elements in the embodiment of the invention which has been selected for the purpose of illustrating the principles thereof. It will nevertheless be appreciated that by the use of specific language no limitation of the scope of the invention is intended, and that various alterations of the construction shown and described are contemplated such as fall within the spirit of the invention.

The invention is illustrated with reference to the forward end of a motor vehicle as represented conventionally by the usual dash 10 and the side frame members 11 and 12. The steering column 15 carrying at its upper end the usual steering hand wheel 16 extends through the dash and within a steering gear housing 18. As shown more particularly in Figure 3, the housing 18 is secured rigidly to the adjacent side frame member 11. Thus bolts 19 extending through a flange 20 formed on the bearing sleeve 21 and through the side frame member 11 may be threaded into bosses formed on or within the housing 18. A transverse shaft 24 journalled in a bearing boss 25 formed integrally with the housing 18, and within the bearing sleeve 21, is provided with a worm gear 27, the latter being either formed integrally with the shaft 24 or rigidly secured thereto. A worm 28 meshing with the worm gear 27 is formed on or secured rigidly to the steering shaft 30, the latter extending through the steering column 15 and being operable by the steering hand wheel 16 to rotate the gearing and thereby the shaft 24.

Except for the fact that the location of the gear housing 18 and the lower end of the steering shaft 30 is well forward of the usual location, the structure thus far described is quite conventional and the details thereof form no essential part of the present invention but may be modified as desired. However, by locating the forward end of the steering shaft adjacent the wheels and/or forwardly of the motor, the steering hand wheel 16 may be disposed in a nearly vertical plane, with consequent increased convenience to the driver both during operation of the vehicle and in entering and leaving the driver's seat. In the preferred embodiment of the invention the steering gear housing 18 will be disposed adjacent to or will extend through a vertical transverse plane containing the road wheel spindles or, as more broadly stated, may extend within the fore and aft limits of the road wheels, it being obviously possible to vary the precise location of the steering shaft to a considerable extent without unduly increasing the angle which the steering hand wheel presents to a vertical plane.

Referring now to the specific form of independent wheel suspension which has been chosen for the purpose of illustrating the application of the present invention thereto, it will be observed that each road wheel 35 is journalled for rotation in the conventional manner on a wheel spindle 36, the latter being integrally formed with a steering knuckle 38 which in turn is supported for swinging steering movement on an axle 40.

Each axle 40 extends transversely of the vehicle frame and is pivotally connected at that end remote from the road wheel carried thereby to a shackle member 42, the latter having articulated connection with the end of the axle and with a bracket 43 secured to the adjacent side frame member, whereby rocking movement of each axle in a generally transverse vertical plane is permitted.

Longitudinally extending leaf spring assemblies 46 are associated with the respective axles 40, each spring assembly being pivotally connected at its rear end to a bracket 48 secured to and depending from the associated side frame member. At its forward end the spring assembly is shackled as indicated at 50 to the forward end of the corresponding side frame member so as to permit longitudinal displacement of the forward end of the spring assembly. Intermediate its ends each spring assembly 46 is secured as indicated at 47 to one of the axles 40.

As is apparent from the drawing, the several leaves of each spring assembly are disposed in planes which are inclined downwardly and inwardly with respect to the horizontal. Otherwise expressed, the spring assembly is supported for flexure in a plane which is inclined with respect to the vertical. Thus as either road wheel rises on meeting an obstruction the associated axle 40 and the wheel assembly will be displaced bodily inwardly of the frame while swinging at the same time about an axis having a varying location but disposed on the arc executed by that end of the shackle member 42 which is connected to the axle. The angle of inclination of the leaf spring and the disposition of the arc on which the inner end of the axle moves are so chosen that the bodily inward displacement of the wheel and the inward tilting of the plane of the wheel resulting from the movement executed by the supporting axle 40 combine to effect substantially vertical displacement of the wheel tread. Similarly, as the wheel falls from a normal position in passing over a depression in the road bed, the outward bodily displacement of the wheel as the result of the inclination of the leaf spring assembly which constitutes a guide for the wheel assembly is substantially offset, so far as the wheel tread is concerned, by the simultaneous outward inclination of the plane of the wheel, it being understood that in either rising or falling movement, the leaf spring is capable of executing the slight twisting movement about the longitudinal axis thereof which is required to permit the necessary swinging movement of the axle with respect to the frame. Since there is no substantial displacement of the wheel tread, tire wear is reduced to a minimum.

As the result of the inward tilting of the wheel plane on upward movement of the wheel and outward tilting of the wheel plane on downward movement of the wheel from a normal or midposition, the wheels always remain substantially parallel to each other and are maintained in substantially perpendicular relation with the road surface in rounding a curve, so that steering control may be effected with ease. It will be understood that canting of the wheels as the result of imperfect road surface when the vehicle is driven straight ahead does not seriously affect the steering since the displacement of the wheel plane is only momentary.

Returning now to the steering mechanism, it will be observed that the left-hand end of the transverse shaft 24 carries a depending steering arm 55 which is rigidly secured to the shaft. The arm 55 is in turn pivotally connected as at 56 to the forward end of a generally longitudinally extending and preferably rearwardly directed link 58, the latter being in turn pivotally connected as at 59 to an arm 60 which is journalled for rotation about a transverse, generally horizontal axis on a bracket 61 secured to the side frame member 11. It will be observed that the arm 60 corresponds generally in location and function to the conventional steering arm which is ordinarily associated directly with the steering gear housing, a steering drag link 65 being pivotally connected as at 66 to the arm 60 and being similarly connected as at 68 to a steering arm 69 secured to or formed integrally with the steering knuckle 38. It is clear from the foregoing description and from an inspection of Figure 1 of the drawing that operation of the steering hand wheel will impart steering movement to the road wheel at the left-hand side of the vehicle, the construction being quite conventional with the exception of the change in location of the steering gear housing and the employment of the additional link 58 to compensate for this extreme forward location.

As hereinbefore explained, the transverse shaft 24 may lie forwardly of the motor, this arrangement being more clearly shown in Figure 4 of the drawing in which the motor is indicated at 72 and the radiator shell at 73. Figure 4 represents the preferred construction in which the transverse shaft 24 is illustrated as being disposed below the usual fan 75, at which point there is adequate space to accommodate the shaft. In order to prevent the application of undesirable stresses to the shaft 24, a universal joint 76 of conventional construction may be interposed between the opposite ends thereof.

At the right-hand side of the vehicle the shaft 24 may extend through a bearing bracket 78 secured to the adjacent side frame member 12, a depending arm 79 being rigidly secured to the shaft 24. A link 80 extending generally longitudinally of the frame and preferably rearwardly is pivotally connected at one end to the arm 79 as indicated at 82 and at the other end to an arm 85 as indicated at 86, the arm 85 being in turn supported for pivotal movement about a substantially horizontal axis on a bracket 87 secured to the side frame member 12. The arm 85 is extended below its pivotal axis and is pivotally connected as at 89 to a steering drag link 90, the latter being in turn pivotally connected as at 92 to a steering arm 93 formed integrally with or rigidly secured to the steering knuckle 38 at the right-hand side of the vehicle.

By means of this construction, operation of the steering hand wheel 16 will be communicated through the shaft 24, the arm 79, and the link 80 to the arm 85, and for any given direction of rotation of the steering hand wheel, the steering drag link 90 will be operated in a direction opposite to the direction of movement of the steering drag link 65 at the left-hand side of the vehicle and thus the two road wheels are connected for conjoint steering movement. It will be appreciated that in the event of failure of the linkage connecting either the arm 55 or the arm 79 with the associated road wheel, steering of the vehicle is still possible, since the connections between the transverse shaft 24 and each road wheel are separate and distinct and the usual caster effect will compel that wheel having the disabled linkage to track properly.

Obviously the linkage at opposite sides of the vehicle can be identical in construction if a double worm gearing is provided, for instance of the type disclosed in the prior patent to Wright 1,723,537, granted August 6, 1929, or alternatively, a construction such as shown in the prior patent to Wright 1,821,458, granted September 1, 1931, may be employed, the arms 55 and 79 being operable in opposite directions on rotation of the steering hand wheel 16 in one direction. Various other changes and alterations will occur to one skilled in the art to which the invention relates.

Having thus described the invention, what is claimed as new and desired to be secured by Letters Patent is:

1. In a motor vehicle, the combination with a vehicle frame, of a pair of steerable road wheels disposed adjacent said frame at opposite sides thereof, a motor for operating said vehicle carried by said frame, means connecting said road wheels for conjoint steering movement, said means including a shaft supported for rotation by said frame and extending across the latter forward of the motor, said shaft being disposed substantially in the vertical transverse plane containing the road wheel axes, and worm gearing for operating said shaft.

2. In a motor vehicle, the combination with a vehicle frame, of a pair of steerable road wheels disposed adjacent said frame at opposite sides thereof, a motor for operating said vehicle carried by said frame, a radiator disposed forwardly of said motor, and means connecting said road wheels for conjoint steering movement, said means including a shaft supported for rotation by said frame and extending across the latter between said motor and said radiator, said shaft being disposed substantially in the vertical transverse plane containing the road wheel axes.

3. In a motor vehicle of the type in which the motor is supported by the frame forwardly of the driver's seat, the combination with oppositely disposed road wheels supported for steering movement on said frame adjacent the forward end of the motor, of a steering shaft having the rearward end thereof disposed adjacent the driver's seat and the forward end thereof extending forwardly of the motor, a transverse shaft disposed substantially in the vertical plane containing the road wheel axes, operative connections between said transverse shaft and said wheels, and worm gearing connecting said steering and transverse shafts.

4. In a motor vehicle of the type in which the motor is supported by the frame forwardly of the driver's seat, the combination with oppositely disposed road wheels supported for steering movement on said frame adjacent the forward end of the motor, of a steering shaft having the rearward end thereof disposed adjacent the driver's seat and the forward end thereof extending forwardly of the motor, and operative connections between said shaft and said wheels, said operative connections including separate steering drag links connected with said wheels and extending rearwardly therefrom, a transverse shaft rotatable by said steering shaft, and means extending rearwardly from said transverse shaft and connected with said drag links.

5. In a motor vehicle, the combination with a vehicle frame, of steerable road wheels disposed at opposite sides of said frame, means supporting said road wheels for independent rising and falling movement with respect to said frame, steering arms associated with the respective wheels and partaking of rising and falling movement therewith, a steering shaft extending longitudinally of the vehicle to a point within the fore and aft confines of the wheels, and operative connections between said steering shaft and said steering arms, said connections including links disposed at opposite sides of the frame, said links being operable by said shaft and extending rearwardly therefrom, links connected with said arms and extending rearwardly therefrom, and means connecting the adjacent links.

6. In a motor vehicle, the combination with a vehicle frame, of steerable road wheels disposed at opposite sides of said frame, means supporting said road wheels for independent rising and falling movement with respect to said frame, steering arms associated with the respective wheels and partaking of rising and falling movement therewith, a steering shaft extending longitudinally of the vehicle to a point within the fore and aft confines of the wheels, and operative connections between said steering shaft and said steering arms, said connections including a transversely extending shaft rotatable by said steering shaft, rearwardly disposed links operably connected with opposite ends of said transversely extending shaft, arms pivoted on said frame and operable by said links, and links operatively connected between the respective steering arms and the last named arms.

7. In a motor vehicle, the combination with a vehicle frame, of steerable road wheels disposed at opposite sides of said frame, means supporting said road wheels for independent rising and falling movement with respect to said frame, steering arms associated with the respective wheels and partaking of rising and falling movement therewith, a steering shaft extending longitudinally of the vehicle, and operative connections between said steering shaft and said steering arms, said connections including links disposed at opposite sides of the frame, said links being operable by said shaft and extending rearwardly therefrom, links connected with said arms and extending rearwardly therefrom, and means connecting the adjacent links.

PETER F. ROSSMANN.